United States Patent [19]

Beck et al.

[11] Patent Number: 5,506,842
[45] Date of Patent: Apr. 9, 1996

[54] METHOD AND APPARATUS FOR TRANSMITTING MESSAGE CELLS VIA AN ATM COMMUNICATION EQUIPMENT

[75] Inventors: Christoph Beck, Munich; Bruno Pfaeffel, Hoehenkirchen-Sieg. Brunn; Michael Stegherr, Neubiberg; Rueidger Tanzke, Munich, all of Germany

[73] Assignee: Siemens Aktiengesellschaft, Munich, Germany

[21] Appl. No.: 163,522

[22] Filed: Dec. 9, 1993

[30] Foreign Application Priority Data

Dec. 21, 1992 [EP] European Pat. Off. ............. 92121721

[51] Int. Cl.⁶ ............................ H04J 3/26; H04L 12/56
[52] U.S. Cl. .......................................... 370/60.1; 370/94.2
[58] Field of Search ................................ 370/58.1, 58.2, 370/58.3, 60, 60.1, 61, 79, 84, 85.1, 85.13, 94.1, 94.2; 395/200, 275

[56] References Cited

U.S. PATENT DOCUMENTS

| | | | |
|---|---|---|---|
| 5,101,404 | 3/1992 | Kunimoto et al. | 370/60 |
| 5,214,642 | 5/1993 | Kunimoto et al. | 370/79 |
| 5,239,539 | 8/1993 | Uchida et al. | 370/60 |
| 5,291,483 | 3/1994 | Nagai et al. | 370/60 |
| 5,303,236 | 4/1994 | Kunimoto et al. | 370/60.1 |
| 5,319,360 | 6/1994 | Schrodi et al. | 370/60 |

FOREIGN PATENT DOCUMENTS

0512141A1  11/1992  European Pat. Off. .

OTHER PUBLICATIONS

IEEE Journal on Selected Areas in Communications, Oct., 1991, No. 8, "Design and Technology Aspects of VLSI's for ATM Switches", Thomas R. Banniza et al., pp. 1255–1265.
Patent Abstracts of Japan; Publication Number JP60030237, published Feb. 15, 1985, Asahina Takeshi et al, "Data Transmission System".

Primary Examiner—Alpus Hsu
Attorney, Agent, or Firm—Hill, Steadman & Simpson

[57] ABSTRACT

An interface (SSE) is provided for transmission of message cells appearing on an offering trunk (ZL) with a specific transmission bit rate and belonging to different virtual connections or virtual paths via inputs of an ATM communication equipment (ATM-K) designed for a lower transmission bit rate. This interface includes a plurality of processors (MBHE, SBHE1, ..., SBHE3) connected to the offering trunk which have their output sides respectively connected to at least one of the inputs. Under the control of one of the processors as a master processor (MBHE), the message cells are cyclically distributed onto all processors and, subsequently, are forwarded by these processors to the ATM communication equipment, upon attachment of a sequence number that is valid at the moment for the respective virtual connection or respective virtual path.

7 Claims, 4 Drawing Sheets

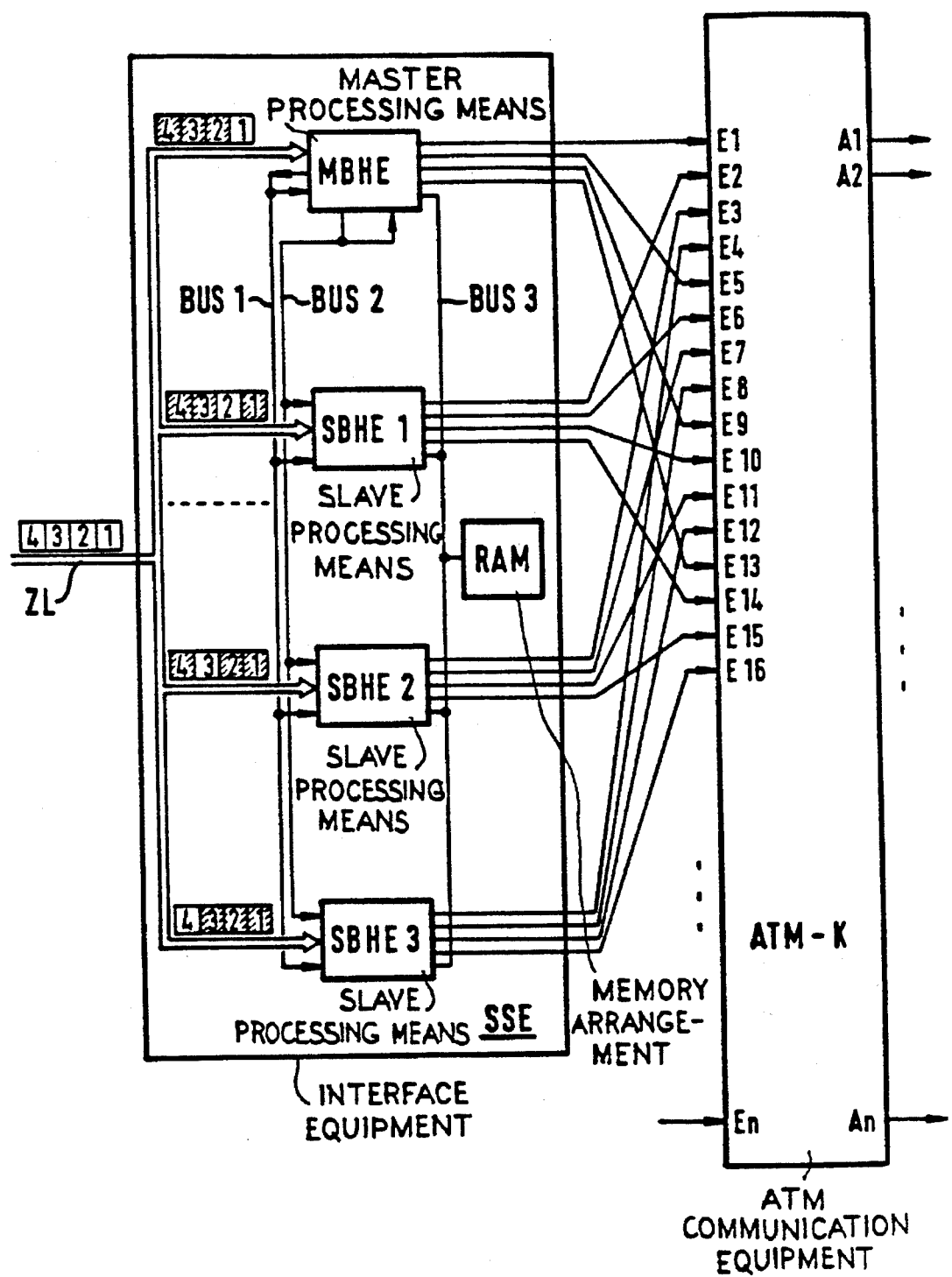

METHOD AND APPARATUS FOR TRANSMITTING MESSAGE CELLS VIA AN ATM COMMUNICATION EQUIPMENT

BACKGROUND OF THE INVENTION

The invention is directed to a method and to a circuit arrangement for transmitting message cells occurring with a first transmission bit rate on an offering trunk during at least one virtual connection or at least one virtual path.

Such a method and such a circuit arrangement have been set forth in European Patent Application 92 11 4798.9, corresponding to Hill Firm U.S. Case No. P-93,1565, U.S. Ser. No. 08/111,000, filed Aug. 24, 1993. It is provided therein that the message cells belonging to a virtual connection are first depacketed. The message signals contained in the message cells are subsequently divided into successive signal sections whose respective bit plurality if uniformly defined such that this bit plurality, plus a defined plurality of information bits, corresponds to the plurality of bits transmittable as useful signals in the information part of a message cell. These signal sections are then successively inserted into the information parts of message cells, whereby a continuously changing signal section sequence number is respectively entered into the information parts as information bits. These message cells are then successively distributed onto a plurality of inputs of an ATM network that corresponds to the bit rate ratio of the first transmission bit rate to the second transmission bit rate, and are transmitted via the corresponding inputs to outputs of the ATM network allocated thereto. The signal section respectively contained in the message cells appearing at the corresponding outputs as well as the signal section sequence number belonging thereto are taken from the message cells appearing at the corresponding outputs. Message signals whose bit plurality respectively corresponds to the plurality of bits transmittable as useful signals in the information part of a message cell are then formed from the sequence of the signal sections for the respective virtual connection. Subsequently, the message signals are successively inserted into message cells referring to the respective virtual connection. These message cells are forwarded on with the original transmission bit rate.

Beyond this, a method has already been disclosed for switching message cells of a transmission system transporting a message cell stream according to an asynchronous transfer method via a switching network constructed with modules (European Patent Application 91 10 7434.2, corresponding to U.S. Pat. No. 5,317,561. The transport bit rate of the transmission system amounts to a multiple of the switching elements of the modules. Upon respective attachment of information, message cells to be switched are thereby distributed onto a plurality of switching network inputs that corresponds to this multiple. This information indicates all those modules via which the respective message cells should be through-connected to an output of the switching network. The message cells transmitted to various outputs are then recombined to form a message cell stream. Among other things, it is provided that a cyclically successive sequence number is attached to the message cells before the through-connection through the switching network, the sequence of the message cells for every connection being assured on the basis of this sequence number when they are combined to form the message cell stream. The message cells are cyclically distributed onto the switching network inputs.

SUMMARY OF THE INVENTION

It is an object of the present invention to show a way of how a method and a circuit arrangement of the type initially cited can be designed in order to distribute message cells appearing on the offering trunk onto a plurality of inputs of an ATM communication equipment and to thereby assure the sequence of the message cells of each and every virtual connection, or of each and every virtual path for the recovery of the original message cell stream after the individual message cells have passed through the ATM communication equipment.

According to a method of the invention for transmitting message cells occurring with a first transmission bit rate on an offering trunk during at least one virtual connection or for at least one virtual path, the message cells are each respectively formed of a cell header having an identifier for the respective virtual connection or for the respective virtual path, and an information part. The message cells are transmitted via an ATM communication equipment working according to an asynchronous transfer mode. The ATM communication equipment has a plurality of inputs. The inputs are respectively designed for acceptance of message cells having a second transmission bit rate that is lower in comparison to the first transmission bit rate. A plurality of processing means in the form of a master processing means and a plurality of slave processing means controlled proceeding therefrom are connected to the offering trunk. Output sides of the processing means are respectively connected to at least one of the inputs of the ATM communication equipment. The plurality of inputs of the ATM communication equipment are connected to the processing means corresponding to the ratio of the first transmission bit rate to the second transmission bit rate. The message cells appearing on the offering trunk are cyclically distributed onto all processing means under clear control of the master processing means, and are initially intermediately stored thereat. The sum of the message cells accepted into the processing means is thus acquired by the master processing means. A current sequence number for a message cell to be forwarded onto the ATM communication equipment as a next message cell is individually offered to the processing means for the individual virtual connections or virtual paths. An internal cell cycle is activated in the processing means in cyclical succession with a defined chronological offset. Proceeding from the master processing means, the slave processing means as well as the master processing means itself are individually successively enabled for the handling of an intermediately stored message cell. Upon attachment of the current sequence number for the respective virtual connection or respective virtual path, an intermediately stored message cell is forwarded onto the ATM communication means by a processing means that has just been enabled and in response to the activation of the next internal cell cycle sequencing therein. The sequence number that is just offered is updated for a following message cell with a respective virtual connection or virtual path. In response to the activation of the internal cell cycle of an enabled processing means, the master processing means deincrements a sum of the momentarily intermediately stored message cells only given an acquired sum>0 for the momentarily intermediately stored message cells. A processing means that follows the processing means that was just enabled is enabled at the end of the corresponding internal cell cycle.

The advantage of the invention is that a synchronization of the processing means both for the acceptance as well as for the forwarding on of message cells to the ATM communication equipment is assured with relatively little control expense on the basis of the control of all processing means by the master processing means. A further advantage is that no central control means is required for this synchronization. Rather, the synchronization is undertaken by a processing means which is itself involved in the acceptance and forwarding on of message cells.

In a circuit arrangement of the invention for transmitting message cells appearing with a first transmission bit rate on an offering trunk during at least one virtual connection or at least one virtual path, the message cells are respectively formed of a cell header having an identifier for the respective virtual connection or virtual path, and an information part. The message cells are transmitted via an ATM communication equipment operating according to an asynchronous transfer mode comprising a plurality of inputs. The inputs are respectively designed for acceptance of message cells having a second transmission bit rate that is lower in comparison to the first transmission bit rate. A plurality of processing means is provided in the form of a master processing means and a plurality of slave processing means controlled proceeding therefrom. The master processing means and plurality of slave processing means are connected to the offering trunk, with each being respectively connected at the output side to at least one of the inputs of the ATM communication equipment. The plurality of inputs of the ATM communication equipment are connected overall to the processing means corresponding to the ratio of the first transmission bit rate to the second transmission bit rate. The master processing means comprises a first control device which drives all processing means in cyclical succession for the acceptance of message cells appearing on the offering trunk. The first control device acquires the sum of message cells accepted into the processing means. The control device enables the processing means in cyclical succession for the forwarding on of accepted message cells. The control device deincrements a sum of the message cells momentarily accepted into the processing means only given an acquired sum> 0 for the message cells momentarily accepted into the processing means and, after the forwarding of a message cell by a processing means just enabled, enables a processing means following thereupon. All of the processing means each have a second control device which, in response to a drive by the first control device, allows the acceptance of a message cell into the respective processing means. The second control device, in response to an enable of the first control device, allows the forwarding during an internal control cycle of a message cell accepted into the respective processing means to the ATM communication equipment, upon attachment of a sequence number prepared for the respective virtual connection or virtual path. The second control device updates the sequence number just offered for a following message cell of the respective virtual connection or of the respective virtual path.

The advantage of this circuit arrangement is that the acceptance and forwarding on of message cells to the ATM communication equipment while observing the sequence of the message cells of a virtual connection or of a virtual path is assured with a relatively low circuit-oriented expense. The low circuit-oriented expense particularly results since all processing means comprise uniform elements for the acceptance and forwarding on of message cells, and only the master processing means has additional means for the synchronization of all processing means available.

BRIEF DESCRIPTION OF THE DRAWINGS

FIG. 1 shows a block circuit diagram of a circuit arrangement wherein the present invention is applied;

DESCRIPTION OF THE PREFERRED EMBODIMENTS

Figure 2A:
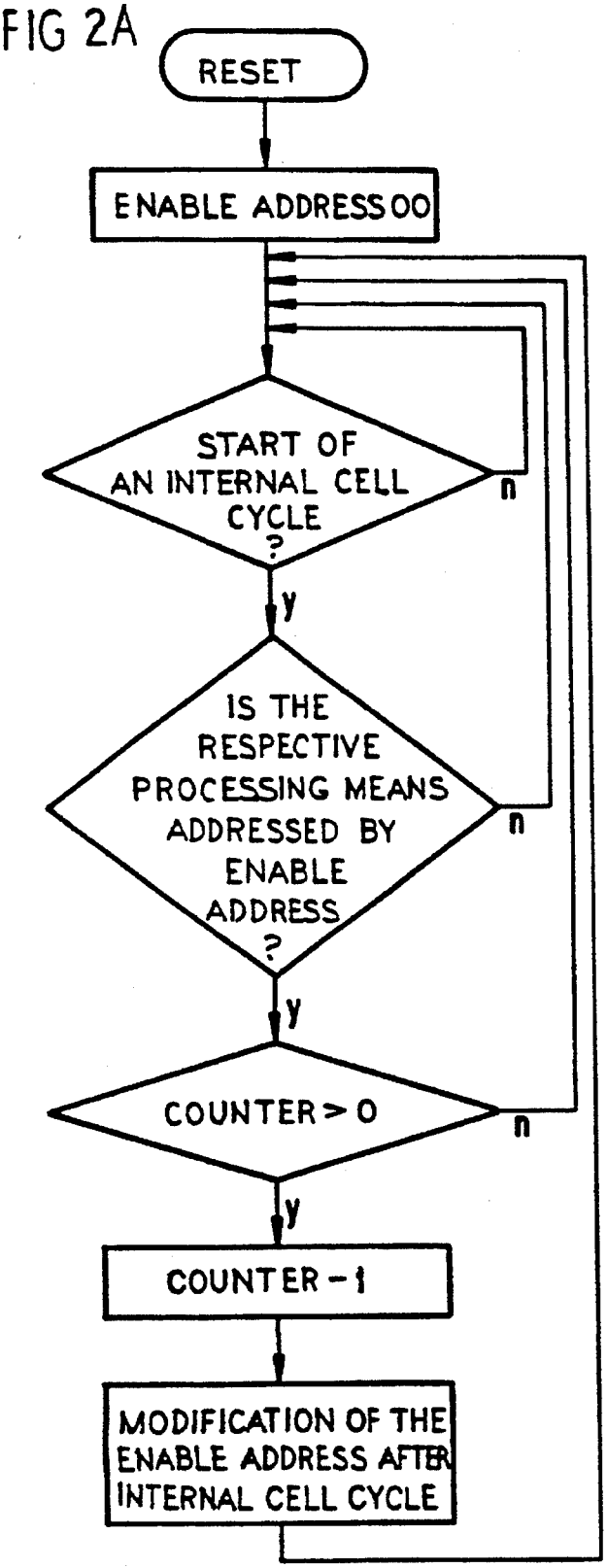
FIGS. 2A and 2B are flow charts showing control processes in the course of accepting and distributing of message cells into or by the processing means, respectively, shown in FIG. 1 and which shall be discussed in greater detail below.

FIG. 1 shows an ATM communication equipment ATM-K operating according to an asynchronous transfer mode, for example in the form of a switching equipment which comprises a plurality of inputs E1 through En as well as a plurality of outputs A1 through An,. The inputs and outputs are thereby respectively designed for the acceptance or output of message cells having a fixed transmission bit rate, each of which respectively has a cell header and an information part available to it. Among other things, an identifier (VCI, VPI) of the respective virtual connection or of the respective virtual path is contained in such a cell header. An interface equipment SSE that has its input side in communication with an offering trunk ZL is connected at least to a defined plurality of inputs E1 through E16. A transmission of message cells occurs via this offering trunk with a transmission bit rate that is higher in comparison to the transmission bit rate defined for the inputs and outputs. The plurality of inputs connected to the interface equipment SSE thereby corresponds to the bit: rate ratio of the transmission bit rate defined for the offering trunk to the transmission bit rate defined for the inputs and outputs of the ATM communication equipment, taking an expansion of the message cells by the interface equipment (which shall be set forth below) into consideration.

The interface equipment SSE comprises a plurality of processing means (four processing means in the present case), which have their input sides connected in parallel in common to the offering trunk ZL. One processing means referenced in MBHE serves as a master processing means. Proceeding therefrom, the remaining three processing means SBHE1, SBHE2 and SBHE3 are controlled as slave processing means. For this control, the slave processing means are connected to the master processing means via two separate control busses BUS1 and BUS2. Beyond this, a data bus BUS3 is provided via which all processing means are connected to a memory arrangement RAM.

The fundamental structure of the interface equipment SSE having been set forth above with reference to FIG. 1, the functioning thereof shall now be set forth in greater detail. The message cells appearing successively on the offering trunk ZL, which may be assumed to be allocated to m different virtual connections, are distributed onto the total of four existing processing means under the control of the master processing means MBHE, and are initially intermediately stored thereat. As schematically shown in FIG. 1 with reference to the example of four successive message cells 1 through 4, for example, the first message cell 1 to arrive is accepted by the master processing means itself, whereas the following message cells 2 through 4 are successively supplied to the slave processing means SBHE1, SBHE2 and SBHE3. This cyclical distribution is then continued for the following message cells. For the control of this distribution, address signals indicating the individual processing means are thereby successively transmitted via the control bus BUS1 proceeding from the master processing means MBHE, respective processing means being activated with these address signals for the acceptance of a message cell. The address signals in the present exemplary embodiment can be transmitted in the form of two bits, whereby, for example, the bit combination 00 is allocated to the master processing means and, by contrast, the bit combinations 01, 10 and 11 are allocated to the slave processing means SBHE1, SBHE2 and SBHE3.

Figure 2B:
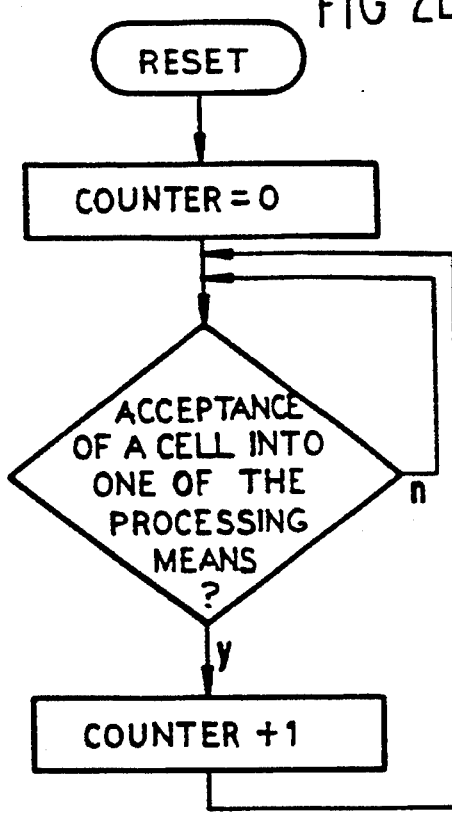

A cell counter in the form, for example, of a counter register, is provided in the master processing means MBHE, the counter reading thereof covering the plurality of message cells intermediately stored overall at the moment in the processing means. Proceeding from an initial counter reading which, for example, can be assumed to be "0", the momentary counter reading is thereby incremented with every acceptance of a message cell into one of the processing means. For this purpose, the master processing means continuously monitors the appearance of message cells on the basis of the cell header which respectively precedes it (FIG. 2B).

Internal cell cycles are repeatedly cyclically activated for the handling of intermediately stored message cells in all processing means, including the master processing means. The activation in the individual processing means thus occurs with a chronological offset defined by the master processing means MBHE. Beyond this, the master processing means designationally enables the individual processing means—including itself—for such a handling. Given a counter reading> 0 of the cell counter, i.e. given the presence of intermediately stored message cells in the processing means, this master processing means MBHE outputs enable addresses in cyclical succession for this purpose via the control bus BUS2, the individual processing means being identified by these enable addresses. The determination of the enable addresses thus correspond to the afore-mentioned addresses determined for the acceptance of message cells into the processing means.

In response to such an enable of a processing means, the counter reading of the cell counter in the master processing means is deincremented at the time of the activation of the next internal cell cycle in the processing means that has just been enabled. This also proceeds from the upper part of the flow chart shown in FIG. 2A. During the course of the activated internal cell cycle, beyond this the cell header of the message cell pending next for forwarding on is interpreted by the enabled processing means to the effect that the identifier contained therein for the virtual connection coming into consideration, or for the virtual path coming into consideration, is taken therefrom, and the afore-mentioned memory arrangement RAM is driven therewith via the data bus BUS3. This memory arrangement RAM comprises a plurality of memory cells corresponding in number to the plurality of virtual connections or virtual paths possible via the offering trunk ZL. These memory cells are individually allocated to these connections or paths, and the identifiers contained in the cell headers of message cells are selectable via these memory cells. A sequence number which is to be attached to a message cell of the respective virtual connection or of the respective virtual path is respectively stored in each of these memory cells.

In response to the drive of the memory arrangement RAM by an identifier output by the processing means, the memory cell allocated thereto is selected and the sequence number contained therein is transmitted to the corresponding processing means. Subsequently, i.e. during the course of the internal control cycle that is activated at the moment, a sequence number incremented by a numerical value in comparison to the sequence number just accepted is written back into the just-addressed memory cell of the memory arrangement RAM by this processing means, namely while overriding the sequence number previously stored therein.

The sequence number accepted into the processing means that has just been enabled is inserted in the present exemplary embodiment into an internal cell header prepared for the respective virtual connection or for the respective virtual path, this internal cell header preceding the cell header contained in the message cell to be now forwarded on as a self-routing cell header. The message cell expanded in this way is subsequently supplied by the enabled processing means to one of the inputs of the ATM communication equipment ATM-K connected thereto.

For the selection of the internal cell header provided for the respective virtual connection or for the respective virtual path, moreover, a local memory arrangement is provided in each processing means, with the internal cell headers to be used for the individual virtual connections or virtual paths being stored therein. The selection of the internal cell header, as in the selection of the memory arrangement RAM, is based on the measure of the identifier of the virtual connection or of the virtual path that is contained in a cell header of a message cell to be forwarded on at the moment.

In the present exemplary embodiment, the respective processing means also translates the cell header originally contained in a message cell with respect to the identification of the virtual connection or of the virtual path, in that this identifier is modified such that this again unambiguously identifies the respective virtual connection or the respective virtual path at that output (A1 through An) of the ATM communication equipment ATM-K that comes into consideration. Since such a translation is already known and is not the subject matter of the present invention, however, this shall not be discussed in greater detail.

The internal cell cycle in the processing means just enabled by the master processing means MBHE is thus concluded. After this, a processing means following in the enable cycle (FIG. 2A) is enabled by the master processing means by transmitting a further enable address, the control events that have just been set forth then likewise sequencing in this following processing means.

The following were initially assumed above: 1) the counter reading of the cell counter that is provided in the master processing means MBHE and covers the sum of the intermediately stored message cells has a value> 0, i.e. message cells are stored with the activation of an internal cell cycle in a processing means enabled by an enable address; 2) deincrementation is subsequently carried out; and 3) a modified enable address is offered by the master processing means after the conclusion of the corresponding internal cell cycle. However, the case can also occur that a counter reading of 0 is present in the counter arrangement with the activation of an internal cell cycle of an enabled processing means. As proceeds from FIG. 2A, a deincrementation of this counter reading is suppressed in this case on the one hand and, on the other hand, a modification of the enable address at the end of the corresponding internal cell cycle by the master processing means is also suppressed. During the course of the internal cell cycle that has just been activated, the processing means that has just been enabled forwards on a prepared dummy cell to the ATM communication equipment ATM-K. This is continued by this processing means and by the other processing means during the course of the respective internal cell cycle until a message cell to be forwarded is again present in the processing means that has just been enabled and, consequently, the cell counter of the master processing means MBHE again assumes a counter reading> 0. Subsequently, a master processing means that is still enabled forwards the accepted message cell in the above-recited way, and the master processing means enables a processing means that follows in the cycle by outputting a modified enable address.

Figure 3:
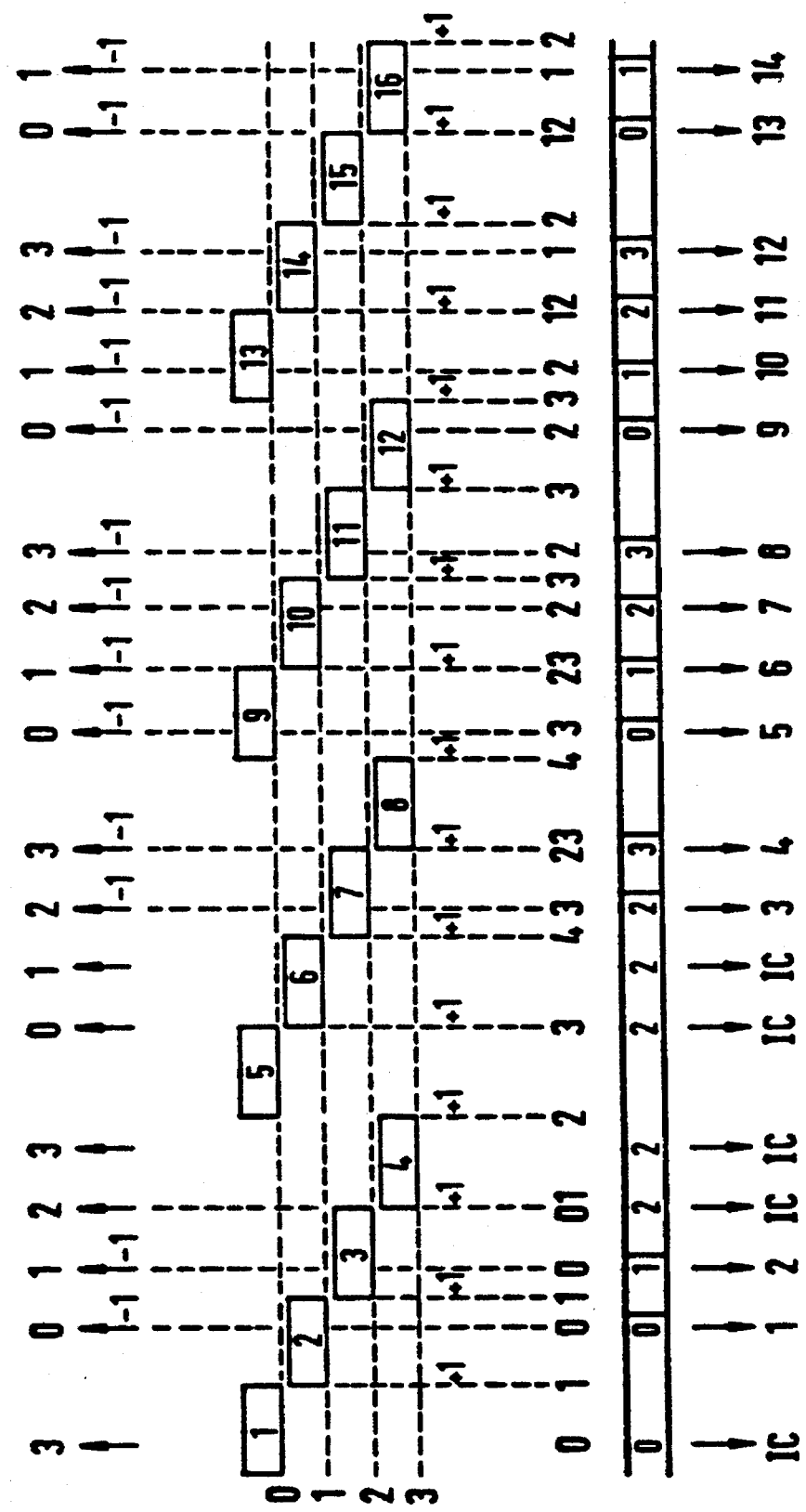
FIG. 3 is a schematic illustration of control procedures.

The above-explained control procedures are again schematically shown in FIG. 3. In the upper area, the activation time of the internal cell cycle sequencing in cyclical repetition in the individual processing means is marked by numbered arrows, whereby the numeral "0" stands for the master processing means (MBHE), and the remaining numerals 1 through 3 stand for the three slave processing means (SBHE1 through SBHE3). The cyclical acceptance of, for example, 16 message cells into the processing means referenced 0 through 3 is shown below in FIG. 3. Vertical broken lines therein symbolize the acceptance with "+ 1" and the forwarding with "−1". These markings are attached to the side next to the broken lines. The counter reading deriving therefrom in the cell counter present in the master processing means results from the line referenced Z. The line lying therebelow, which is referenced FADDR (enable address), recites the processing means just enabled by the master processing means for each of the internal cell cycles shown in the upper region of FIG. 3. Finally, the last line of this figure notes the numbers of the message cells forwarded by the enabled processing means. IC thereby stands for the afore-mentioned dummy cell.

Figure 4:
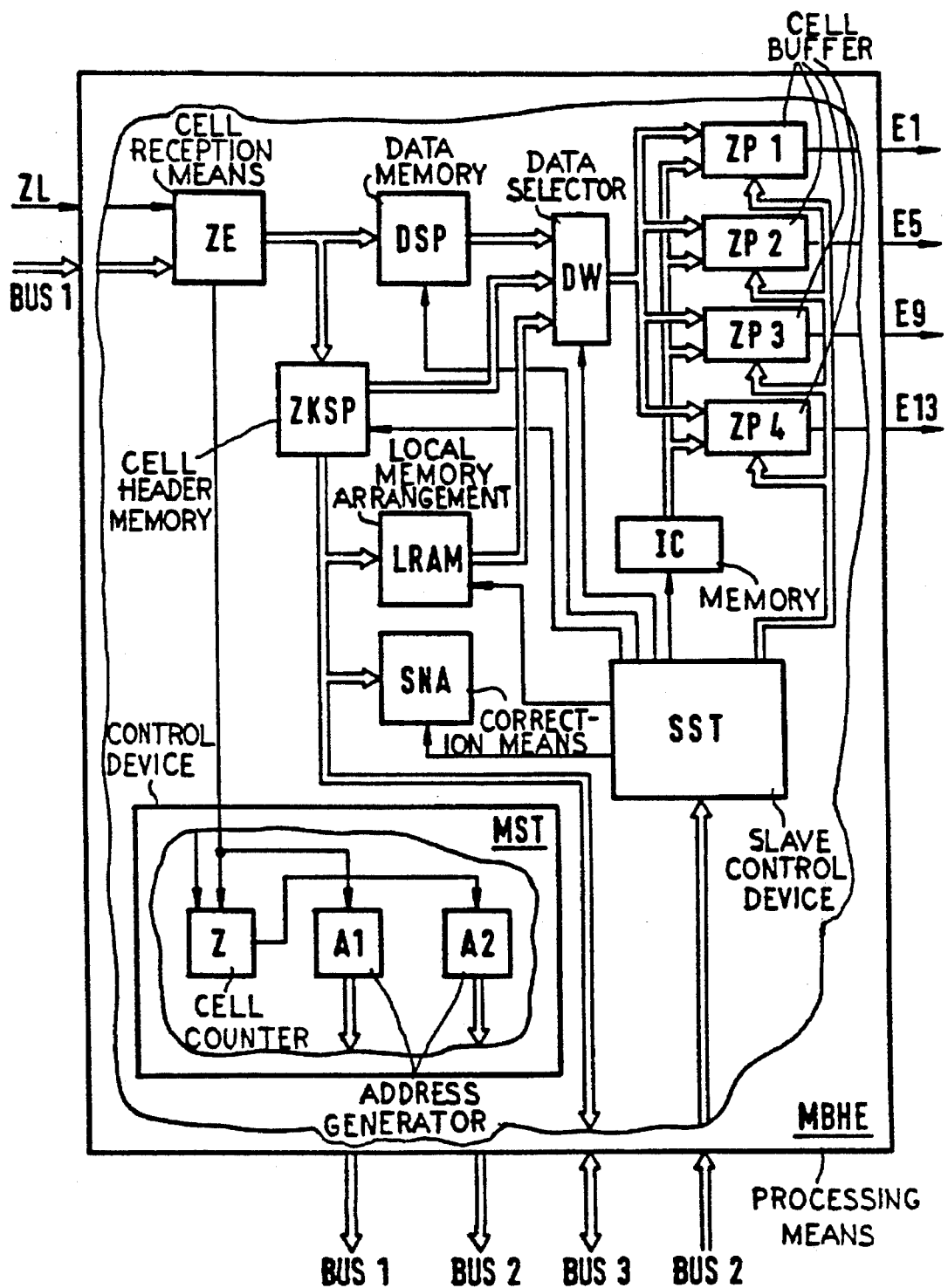
FIG. 4 shows a possible structure of a processing means schematically shown in FIG. 1.

FIG. 4 schematically shows the possible structure of one of the processing means set forth above and shown in FIG. 1. Only those circuit elements required for explaining the present invention are thereby indicated. The processing means are all constructed in the same way. The control device provided for the master function and referenced MST in FIG. 4 is thereby activated in only one of the processing means. The control device MST comprises the afore-mentioned cell counter Z in the form of a forward/backward counter. At its input side, this control device is in communication with a cell reception means ZE via an incrementation input. Furthermore, the master control means MST comprises two address generators A1 and A2. The address generator A1 has its input side connected to the just-mentioned cell reception means ZE and has its output side connected to the control bus BUS1 shown in FIG. 1 in order to offer the address signals that are required for the cyclical acceptance of message cells in the individual processing means. The address generator A1, by contrast, has its input side connected to the output of the cell counter Z and has its output side connected to the control bus BUSL2 in order to transmit enable addresses thereover for the individual processing means for the forwarding of message cells intermediately stored in them. Beyond this, the cell reception means ZE is in communication with the control bus BUS1.

The cell reception means ZE constantly monitors the appearance of message cells on the offering trunk ZL. Every appearance is thus signalled to the master control device MST in order to increment the cell counter Z contained therein. When an address indicating the illustrated processing means is offered via the control bus BUS1, then the cell reception means ZE forwards this; otherwise, however, this forwarding is inhibited. Under the control of a slave control device SST connected to the control bus BUS1, the cell header of such a forwarded message cell is accepted into a cell header memory ZKSP. The information part, by contrast, is accepted into a data memory DSP. In the present exemplary embodiment, these memories have a memory capacity for the acceptance of a plurality of cell headers or information parts.

The afore-mentioned, internal cell cycles are activated by the slave control device SST. Given the presence of an enable address on the control bus BUS2 that indicates the illustrated processing means, the cell header memory ZKSP is first selected given the activation of such an internal cell cycle. It is selected in order to supply the identifier for the respective virtual connection or for the respective virtual path contained in a cell header of a message cell to be forwarded to the memory arrangement RAM shown in FIG. 1 via the data bus BUS3. Beyond this, a local memory arrangement LRAM that has already been cited above is charged with this identifier in order to select that memory cell therein wherein the internal cell header that determines the respective virtual connection or the respective virtual path is stored. The sequence number transmitted from the memory arrangement RAM via the data bus BUS3 is accepted into this memory cell. At the same time, this sequence number is supplied to a correction means SNA which corrects this sequence number and subsequently transmits it back to the memory arrangement RAM via the data bus BUS3.

At their output side, the data memory DSP, the cell header memory ZKSP, as well as the local memory arrangement LRAM are in communication with a data selector DW which, again under the control of the slave control device SST for a message cell to be forwarded, first forwards the internal cell header offered by the local memory arrangement, subsequently forwards the original cell header stored in the cell header memory ZKSP, and finally forwards the information part stored in the data memory for the corresponding message cell via its output. Four cell buffers ZP1 through ZP4 are connected to this output, each being respectively connected to one of the inputs of the ATM communication equipment ATM-K shown in FIG. 1. Proceeding from the slave control device SST, one of these cell buffers is thereby selected for the acceptance of the message cell delivered from the data selector DW in order to forward the message cell to the ATM communication equipment.

Finally, the processing means shown in FIG. 4 also comprises a memory IC connected to the cell buffers for storing a dummy cell, this memory IC being always activated proceeding from the slave control device when, as mentioned above, no message cell is stored in the processing means at the time of the activation of an internal cell cycle.

Although various minor changes and modifications might be suggested by those skilled in the art, it will be understood that we wish to include within the scope of the patent warranted hereon, all such changes and modifications as reasonably come within our contribution to the art.

We claim as our invention:

1. A method for transmitting message cells occurring with a first transmission bit rate on an offering trunk during at least one virtual connection or at least one virtual path, the message cells each being respectively formed of a cell header having an identifier for a respective virtual connection or virtual path, and an information part, comprising the steps of:

transmitting the message cells via an ATM communication equipment working according to an asynchronous transfer mode, said ATM communication equipment having a plurality of inputs, and wherein the inputs are respectively designed for acceptance of message cells having a second transmission bit rate that is lower in comparison to the first transmission bit rate;

connecting to said offering trunk a plurality of processing means comprising a master processing means and a plurality of slave processing means controlled from the master processing means;

connecting output sides of the master processing means and the slave processing means to at least one of the inputs of the ATM communication equipment, and the plurality of inputs of the ATM communication equipment being connected overall to the master processing means and the slave processing means corresponding to a ratio of the first transmission bit rate to the second transmission bit rate;

cyclically distributing message cells appearing on the offering trunk onto the master processing means and the slave processing means under control of the master processing means, and initially intermediately storing them thereat;

acquiring by the master processing means a sum of the message cells accepted into the master processing means and the slave processing means;

individually offering to the master processing means and the slave processing means for the individual virtual connection or virtual path a current sequence number for a message cell to be forwarded onto the ATM communication equipment as a next message cell;

successively activating an internal cell cycle in the master processing means end the slave processing means with a defined chronological offset;

proceeding from the master processing means, successively enabling for the handling of an intermediately stored message cell the slave processing means as well as the master processing means itself;

upon attachment of said current sequence number for the respective virtual connection or virtual path, forwarding said intermediately stored message cell to the ATM communication equipment by the master processing means or the slave processing means, respectively, that has just been enabled and in response to activation of a next internal cell cycle sequencing therein, and updating the sequence number that is just offered for a following message cell of the respective virtual connection or virtual path; and in response to activation of an internal cell cycle of an enabled master processing means or the slave processing means, decrementing with the master processing means a sum of momentarily intermediately stored message cells only given an acquired sum>0 for said momentarily intermediately stored message cells, and enabling the master processing means or the slave processing means that follows the master processing means or the slave processing means that was just enabled at an end of the corresponding internal cell cycle.

2. A method according to claim 1 including the step of forwarding a dummy cell to the ATM communication equipment during an internal cell cycle by said master processing means and the slave processing means in case no message cell is momentarily stored in the respective processing means.

3. A method according to claim 1 including the step of inserting by a respective master processing means or the slave processing means a sequence number to be attached to a message cell to be forwarded into an internal cell header determined for the ATM communication equipment, said internal cell header preceding an original cell header of the message cell to be forwarded.

4. A circuit arrangement for transmitting message cells appearing with a first transmission bit rate on an offering trunk during at least one virtual connection or at least one virtual path, said message cells being respectively formed of a cell header having an identifier for the respective virtual connection or virtual path, and an information part, comprising:

an ATM communication equipment operating according to an asynchronous transfer mode and having a plurality of inputs, the inputs being respectively designed for acceptance of message cells having a second transmission bit rate that is lower in comparison to said first transmission bit rate;

an interface for transmitting the message cells on the offering trunk to the ATM communication equipment;

said interface comprising a plurality of processing means including a master processing means and a plurality of slave processing means controlled from the master processing means, said master processing means and said plurality of slave processing means being connected to said offering trunk, and each of the master processing means and the slave processing means being respectively connected at an output side to at least one of the inputs of the ATM communication equipment, the plurality of inputs of the ATM communication equipment connected to the master processing means and the slave processing means corresponding to a ratio of the first transmission bit rate to the second transmission bit rate;

said master processing means comprising a first control device for driving the master processing means and the slave processing means in cyclical succession for acceptance of message cells appearing on the offering trunk, acquiring a sum of message cells accepted into the master processing means and the slave processing means, enabling the master processing means and the slave processing means in cyclical succession for forwarding accepted message cells, and decrementing a sum of the message cells momentarily accepted into the master processing means and the slave processing means only given an acquired sum> 0 for message cells momentarily accepted into the master processing means and the slave processing means and, after the forwarding of a message cell by the master processing means or the slave processing means just enabled, enabling the master processing means or the slave processing means following thereupon; and the master processing means and the slave processing means each respectively comprising a second control device for allowing acceptance of a message cell into the respective master processing means or the slave processing means in response to a drive by the first control device, allowing, in response to an enable by the first control device and during an internal control cycle, a forwarding of a message cell accepted into the respective master processing means or the slave processing means to the ATM communication equipment upon attachment of a sequence number prepared for the respective virtual connection or respective virtual path, and updating the sequence number just offered for a following message cell of the respective virtual connection or virtual path.

5. A circuit arrangement according to claim 4 wherein the master processing means and the slave processing means have said first and said second control devices available to them, the first control device being only activated in the master processing means.

6. A circuit arrangement according to claim 5 including the master processing means and the slave processing means having a sequence number memory comprising a plurality of memory cells allocated to them in common;

a sequence number that is just current being individually stored in the sequence number memory for the individual virtual connections or virtual paths;

the memory cells being individually driven based on a measure of an identifier contained in the original cell header of a message cell to be forwarded by the master processing means or slave processing means just enabled during the course of an internal cell cycle by the master processing means; and in response to such a drive of one of said memory cells, said one memory cell first offering the current sequence number and subsequently, accepting a modified sequence number under control of the respective master processing means or slave processing means while overwriting the previously current sequence number.

7. A circuit arrangement according to claim 4 wherein the first control device of the master processing means is in communication via two separate control buses with the second control devices of the master processing means and the slave processing means in order to drive these via said control buses for the acceptance of message cells or in order to enable these for forwarding of accepted message cells.

* * * * *